(12) United States Patent
Berg

(10) Patent No.: US 6,276,215 B1
(45) Date of Patent: Aug. 21, 2001

(54) SENSOR FOR MEASURING STRAIN

(75) Inventor: Arne Berg, Kattem (NO)

(73) Assignee: Optoplan AS, Trondheim (NO)

( * ) Notice: Subject to any disclaimer, the term of this patent is extended or adjusted under 35 U.S.C. 154(b) by 0 days.

(21) Appl. No.: 09/555,505

(22) PCT Filed: Dec. 3, 1998

(86) PCT No.: PCT/NO98/00358

§ 371 Date: Jun. 5, 2000

§ 102(e) Date: Jun. 5, 2000

(87) PCT Pub. No.: WO99/32911

PCT Pub. Date: Jul. 1, 1999

(30) Foreign Application Priority Data

Dec. 5, 1997 (NO) .................................................. 19975656

(51) Int. Cl.$^7$ ..................................................... G01L 1/24
(52) U.S. Cl. ........................ 73/800; 250/227.14; 385/13
(58) Field of Search ................... 73/800; 385/12, 385/13; 250/227.14

(56) References Cited

U.S. PATENT DOCUMENTS

| | | | |
|---|---|---|---|
| 5,182,779 | * 1/1993 | D'Agostino et al. | 385/13 |
| 5,564,832 | * 10/1996 | Ball et al. | 374/161 |
| 5,682,445 | * 10/1997 | Smith | 385/7 |
| 5,745,615 | * 4/1998 | Atkins et al. | 385/37 |
| 5,889,901 | * 3/1999 | Anderson et al. | 385/12 |
| 5,940,556 | * 8/1999 | Moslehi et al. | 385/28 |
| 5,973,317 | * 10/1999 | Hay | 250/227.14 |

* cited by examiner

*Primary Examiner*—Max Noori
(74) *Attorney, Agent, or Firm*—Dennison, Scheiner, Schultz & Wakeman

(57) ABSTRACT

A tension sensor including an optical fibre having a Bragg grating is disclosed, the sensor including a housing and a support member shorter that the housing coaxially disposed therein and connected to the housing at one end. The fiber runs along the longitudinal axis of the housing and is connected to one end of the housing and to at least one location on the support member. A second Bragg grating may be provided within the support member to allow for additional measurements for temperature compensation purposes.

8 Claims, 2 Drawing Sheets

SENSOR FOR MEASURING STRAIN

FIELD OF THE INVENTION

The present invention relates to a device for measuring tensile forces as defined in the introductory part of claim 1.

BACKGROUND OF THE INVENTION

The present invention is based on the principle of utilizing a fibreoptical Bragg grating. A Bragg grating is single modus fibre with permanent periodic variation of the refractive index over a fibre length of, for example 0.1 to 10 cm. The variation in the refractive index is established by illuminating the fibre with a UV laser. A Bragg grating reflects light with a wavelength that depends upon the refractive index and the space related period of the variation of the refractive index (the grating period), while light beyond this wavelength will pass through the grating more or less unhindered. The light reflected by the Bragg grating will exhibit a wavelength that varies as a function of a measurable quantity that changes the refractive index of the fibre material grating and/or the fibre length in the gratina zone (grating period). Tension in the fibre or temperature variations will therefore lead to a change of the wavelength of the light reflected by the Bragg grating.

For practical purposes one can, for example measure the temperature in the region −100° C to +250° C with (in the order of) 20 different points along the fibre for fibres with a length of up to 50–100 km. Using various multiplexing techniques, the number of measurement points can be increased. Examples of areas of application are temperature surveillance of power cables, pipelines, electrical transformers, engines and temperature monitoring of industrial processes.

A number of devices for measurement of tension in mechanical constructions exist. For special purposes where there is little space available, high temperature. high tension and so forth, all known devices for measurement of tensile forces have functional disadvantages. For example present measurement of tension under water is made with tensile sensitive sensors based on electrical elements, which in such environments exhibit low reliability. For other areas of application there may be little space available for installing extra components, such as tension sensors based on electrical induction or capacity (typical diameter 10–20 mm). Another example is the surveillance of darn with sensors based on electrical strain gauges. In such connections lightening strikes have sometimes rendered the sensor elements or the electronic circuits passive, and thus disabled the tension surveillance.

Accordingly there is a need for a tension sensor with mainly passive components that can be utilized in difficult environments and narrow spaces.

The objective of the present invention is to provide a device of this type for tension measurement in and on mechanical constructions.

SUMMERY OF THE INVENTION

This objective is achieved with a device according to the characterizing part of claim 1. Beneficial features are disclosed by the dependent claims.

The invention relates to a device for measuring tension in mechanical constructions, the device comprising:

an optical fibre provided with a first Bragg grating,
an elongated housing arranged to encompass the optical fibre and to be attached to the construction to be measured, whereby the housing includes a first end and a second end and includes a first attachment site at the first end of the housing in order to establish a solid attachment between the housing and the optical fibre,
an elongated support member with a mechanical strength greater than the strength of the optical fibre and with a length shorter than the length of the housing. whereby one end or section of the support member is solidly attached to the housing at the second end of the same, and a second end extending freely along a part of the length of the housing. the support member exhibiting a second attachment site in order to establish a solid attachment between the support member and the optical fibre,
thus establishing a segment of an optical fibre comprising said Braog grating strapped between said first and said second attachment site of the housing and the elongated support member respectively .

This principal design of a tension sensor renders it possible to produce tension sensors with very small dimensions and with a measurement range from low tensions to tensions of several thousand microstrain in distant positions. The device also has the possibility of measuring tension in different positions along the same optical fibre.

Examples of mechanical constructions is meant constructions which can benefit from the invention are bridges, dams, platforms. cables, flexible pipes and the like.

To compensate for temperature related variations in measurements detected by the first Bragg grating, the support member preferentially includes a third attachment site for an optical fibre, localized in the region between the second point of attachment and the holding member of the section of the support member that extends freely along the housing, whereas the optical fibre exhibits a second Bragg-grating (reference grating) localized between the second and the third attachment sites. Since the reference grating is arranged in the part of the support member which is free in relation to the housing, there will only be minor strain on it from mechanical strain that is exerted to the housing, so that variations in measurements conducted by the reference grating mainly relate to temperature variations.

In a preferred embodiment of the invention the housing has a generally cylindrical shape and a generally cylindrical bore, the support member is a generally cylindrical shaped tubing with an external diameter less than the internal diameter of the housing.

The support member is preferably constructed from a material with the same thermal expansion coefficient as the surrounding construction to be measured, thus compensating tension loads which are merely temperature related.

BRIEF DESCRIPTION OF THE DRAWING

The invention is described in further detail by reference to a preferred embodiment illustrated by the accompanying drawings, where.

DETAILED DESCRIPTION OF THE PREFERRED EMBODIMENTS

Figure 1:
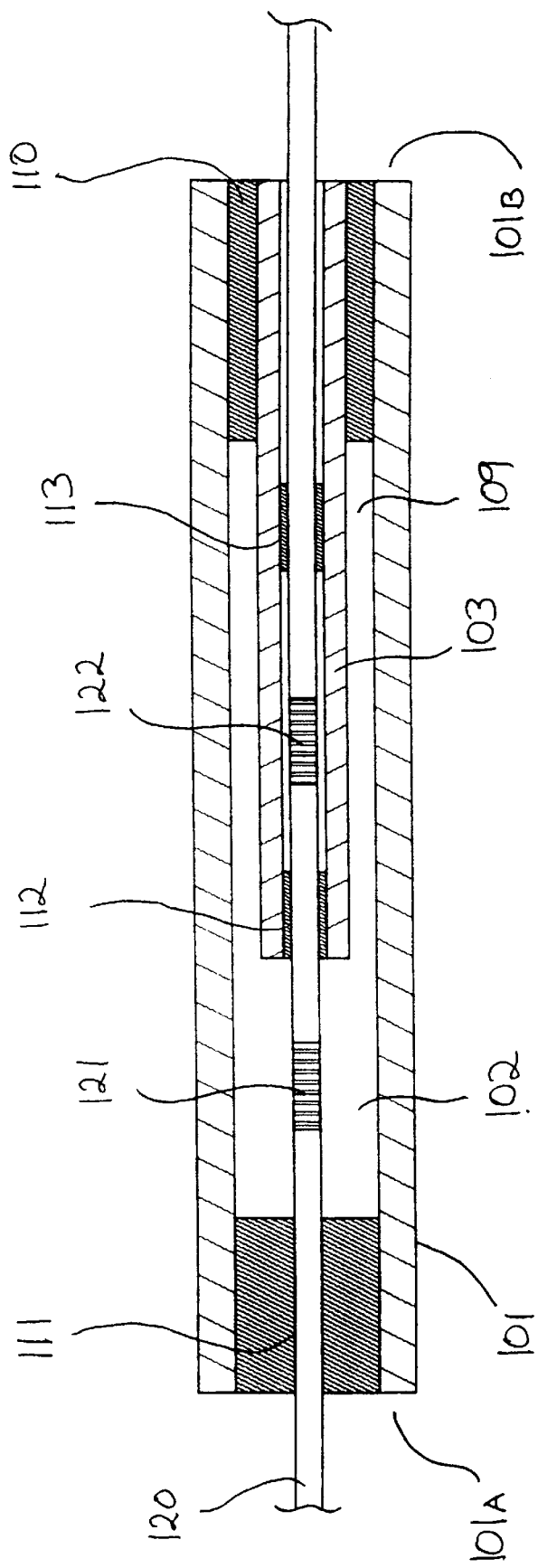
FIG. 1 shows an axial crossection schematic of an example of the device according to the invention for monitoring tension in mechanical structures.

FIG. 1 shows a first embodiment of a tension sensor according to the invention. The tension sensor includes an elongated generally cylindrical housing 101 with an inner cylindrical bore 102 and with a first end 101*a* and a second end 101*b*, arranged to encompass an optical fibre 120 extending through the bore 102 of the housing.

Inside the bore 102, at the second end 101*b* of the housing is arranged a support member in the form of a generally cylindrical tube 103 with a diameter less than the internal diameter of the housing 101 and a length shorter than the length of the housing 101. The internal tube 103 extends generally coaxially with the housing 101 and has an internal opening with dimension sufficient to encompass optical fibre 120. The tube 103 is in its one end solidly attached to the second end 101*b* of the cylindrical housing 101 by means of a holding member 110, such as a glue joint, and extends freely into the cylindrical bore 102 of the housing 101 thus establishing a ring shaped room 109 between the external surface of the tube 103 and the internal surface of the housing 101. The free part of the tube 103 is thus not exposed to tension forces that is exerted to the housing 101.

At the first end of the housing 101*a* is arranged a first point of attachment 111 for the optical fibre 120 to the housing 101. In this embodiment the first point of attachment 111 also constitutes a sealing or a barrier against intrusion of pressure or fluids from the surroundings, and may be established, for example, in the form of a glued joint arranged sealingly in the space between the fibre 120 and the internal surface of the housing 101.

The fibre includes a first Bragg grating 121 freely strapped between the first point of attachment 111 and a second point of attachment 112 localized at the free end of the internal tube 103, thus providing a strapped fibre segment between the housing 101 by the point of attachment 111 and the internal tube 103 by the second point of attachment 112.

A second Bragg grating 122 is strapped between the second attachment site 112 and a third attachment site localized to the part of the tubing 103 which is not exerted to tension forces that effect the housing 101, i.e. in a distance from the holding member 110.

The housing 101 to be exposed to tension is externally attached to the surrounding mechanical construction to be monitored along the entire length of the housing (101) (e.g. by gluing) or at both ends of the housing.

When the housing 101 is stretched the first Bragg grating 121 will undergo the same total elongation as the housing when the tension is transferred by the tubing 103. The second Bragg grating 122 and the tubing 103 will experience an elongation that is substantially less as the mechanical strength (crossection and elasticity modulus) of the tube 103 is substantially greater than that of the fibre.

Figure 2:
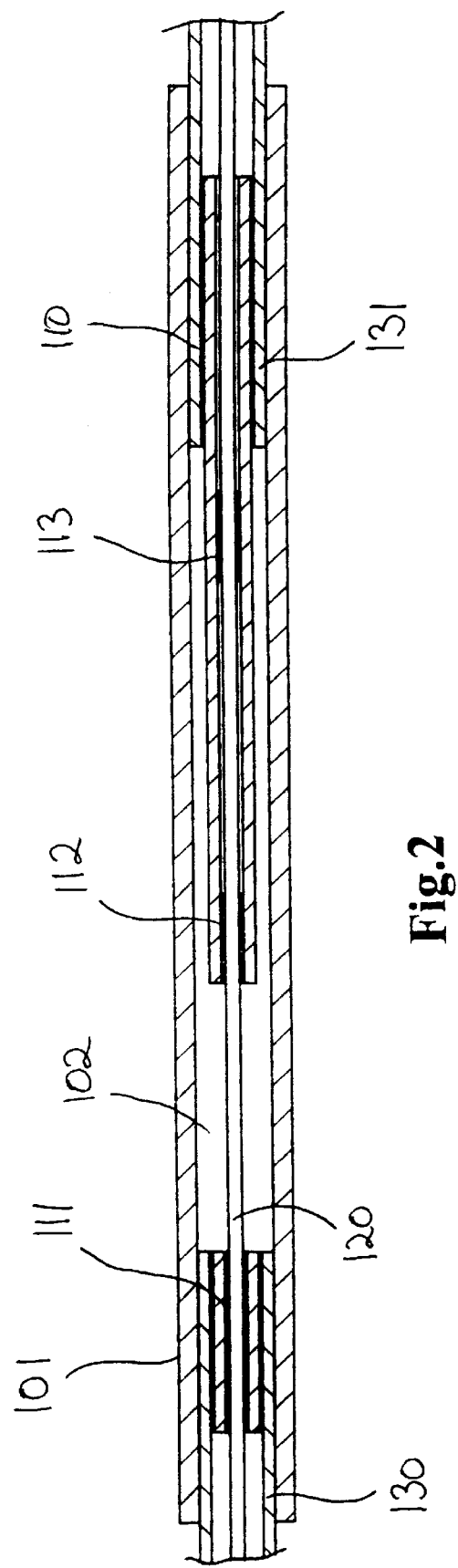
FIG. 2 shows an example of the practical utilization of the principle of the invention.

The optical fibre 120 is made of glass with a small diameter and must be protected against the surroundings in most of the practical applications in the embodiment shown in FIG. 2, which shows an alternative embodiment in the form of an elongated tube, separate tubes 130 and 131 extend partially into the bore 102 of the housing 101*a* nd are solidly attached to the housing 101. This embodiment provides extra protection and may be utilized on both sides of the housing 101. The tubes 130 and 131 are attached to the housing 101 so that each end may constitute or be a part of the attachment site 111 and the holding member 110 respectively, as shown in FIG. 2. The Bragg gratings are for the sake of clarity not shown here.

If the housing 101, which is exposed to tension, is attached at each end of the housing 101, e.g. at the holding members 111 and 110, and is exerted to a force F (not illustrated), the elongation $\epsilon_H$ may be expressed by the following equation:

$$\epsilon_H = \frac{\Delta H}{H} = \frac{F}{E_H + A_H}$$

here delta $\Delta H$ is the absolute change in length of the housing 101, H is the starting length of the housing 101 (alternatively between the attachment sites (not shown) on the housing to the construction to be measured), $A_H$, is the crossectional area of the walls of the housing 101*a* nd $E_{11}$ is the elasticity modulus for the material of the housing. As made evident from the equation above. the specific extension compression of the housing will increase with increasing force and with decreasing strength (crossectional area and elasticity modulus) of the housing.

If the housing 101 is solidly attached to the surrounding construction along its entire length H. e.g. by gluing or welding, the relative extension $\epsilon_H$ of the housing will be the same as for the surrounding construction.

Since the real extension $\Delta H$ of the housing 101 is the same as the extension of the fibre with the Bragg grating 121 between the attachment sites 111 and 112, the specific extension $\epsilon_1$ of the grating 121 may be expressed by the following equation:

$$\epsilon_1 = \frac{H}{L_1} \cdot \epsilon_H = \frac{H}{H-R} \cdot \epsilon_H$$

where H is the length of the housing 101, $L_1$ is the length of the fibre with the Bragg grating 121 (between attachment sites 111 and 112) and $\epsilon_H$ is the specific extension of the housing 101*a* s defined by the previous equation. R is the length of the internal tube 103 between the attachment site 112 and the second holding member 110. From this equation one can recognise that using a longer tube 103 as compared to the grating length $L_1$ (R+$L_1$=H),will lead to an enhancement of the grating extension $\epsilon_1$ compared to the extension $\epsilon_H$ of the housing 101.

In one embodiment the entire device, with the obvious exception of the fibre, is constructed of metal. Metal materials are generally preferred as they combine high mechanical strength with weldability and a certain degree of elasticity, which is required for applications for the measurement tensile forces. For applications where small diameters of the sensors are required, both housing 101, internal tube 103 and protecting tube 130, 131 can be made from cannula tubes. The tension sensors may thus be produced with diameters of the housing and tubes in the order of 1 mm in diameter. For measuring forces the crossection of the housing exposed to strain and the mechanical properties of the material of the housing, is adjusted according to the force range to be measured.

To compensate temperature dependent wavelength displacement with relation to light reflected from the Bragg grating, which primarily is caused by a change in the refractive index of the fibre material as a direct function of the temperature change, a reference grating 122 (Bragg grating) is established. As indicated above the reference grating is arranged between the attachment sited 112 and 113 in the internal tube 103. Thus this grating, is only to a small extent exposed to mechanical forces caused by tensions on the housing 101 or forces that propagate along the fibre 120. The device is calibrated at different temperatures to achieve a measurement of wavelength displacement as a function of tension which is as unaffected by temperature as possible.

If the internal tube 103 is manufactured from the same material as the surrounding construction, the sensor may be calibrated to eliminate extension caused by thermal expansion of the surrounding structure. The sensor will thus only respond to extensions caused by mechanical tension.

From the foregoing description it is evident for a person skilled in the art that the different components do not necessarily have the geometry showed by the drawings. Consequently, the member to be exposed to tension may for example, have a crossection that deviates from a circular shape. it may be oval, square etc. The same applies to the other components. The central issue with the invention is, however, that the member to be exposed to tension shall be able to transmit extension to the connective member and further to the connected Bragg, grating.

The invention thus provides a device for measuring tension in mechanical constructions. which enables measurement over a broad range of tensions and with high precision and which compensates for deviations caused by temperature fluctuations. In addition the device according to the invention can be designed to be very small and can therefore be installed in places where measurement usually has not been possible. Another advantage with the device according to the invention is that the fibre is not exposed to external hydrostatic pressure, and will therefore exhibit a high reliability. Finally, this design does not require pressure tight connections for the fibre.

What is claimed is:

1. A tension measuring device, comprising:

an optical fibre having a first Bragg grating (121);

an elongated housing (101) encompassing the optical fibre (120);

the housing having a first end (111*a*) and a second end (101*b*) and a first attachment site (111) located at the first end (111*a*) of the housing, said optical fibre being secured to said housing at said first attachment site (111);

an elongated support member (103) having a mechanical strength greater than the strength of the optical fibre (120) and having a length shorter than the length of the housing (101) and being disposed within said housing, and encompassing said optical fibre, wherein one end or section of the support member (103) is solidly attached to the housing (101) at the housing second end (101*b*), and a second end of the support member extends freely within the housing (101), the support member (103) further including a second attachment site (112) for securing the optical fibre (120) within said support member (103), wherein said first Bragg grating (121) is held between said housing first attachment site (111) and said support member (112). Wherein the tension in said housing is measured by measuring the wavelength of a reflected light by said frist Brag grating.

2. Device according to claim 1, further comprising a third attachment site (113) for the optical fibre (120) located in a region between the second attachment site (112) and a holding member (110) in the region where the support member (103) is free from contact with the housing (101), and a second Bragg grating (122) located between the second attachment site (112) and the third attachment site (113).

3. Device according to claim 1, characterized in that the housing (101) has a generally cylindrical shape and with a generally cylindrical bore (102), and that the support member (103) is a generally cylindrical tubing with an external diameter less than the internal diameter of the housing (101).

4. Device according to claim 1, characterized in that the support member (103) is constructed from a material with the same thermal expansion coefficient as a surrounding construction to be measured.

5. Device according to claim 1, further comprising a first tube portion disposed between the interior of said housing and said first attachment site (111), and a second tube portion disposed between the interior of said housing and said holding member (110) at the opposite end of said housing, each of said first and said second tube portions being sealingly and solidly secured to said portions of the interior of the housing.

6. Device according to claim 2, further comprising a first tube portion disposed between the interior of said housing and said first attachment site (111), and a second tube portion disposed between the interior of said housing and said holding member (110) at the opposite end of said housing, each of said first and said second tube portions being sealingly and solidly secured to said portions of the interior of the housing.

7. Device according to claim 3, further comprising a first tube portion disposed between the interior of said housing and said first attachment site (111), and a second tube portion disposed between the interior of said housing and said holding member (110) at the opposite end of said housing, each of said first and said second tube portions being sealingly and solidly secured to said portions of the interior of the housing.

8. Device according to claim 4, further comprising a first tube portion disposed between the interior of said housing and said first attachment site (111), and a second tube portion disposed between the interior of said housing and said holding member (110) at the opposite end of said housing, each of said first and said second tube portions being sealingly and solidly secured to said portions of the interior of the housing.

* * * * *